United States Patent [19]

Ward et al.

[11] Patent Number: 4,929,522

[45] Date of Patent: May 29, 1990

[54] HIGH CURRENT CAPACITY ELECTRICAL CORROSIVE ELECTROLYTE BATTERY ELECTRICAL INTERCONNECTION SYSTEM

[76] Inventors: Edwin J. Ward, P.O. Box 482, Hatch, N. Mex. 87937; Thomas C. Ward, II, P.O. Box 215, Carrizozo, N. Mex. 88301

[21] Appl. No.: 286,504

[22] Filed: Dec. 19, 1988

[51] Int. Cl.$^5$ .................................. H01M 2/32
[52] U.S. Cl. ............................ 429/178; 429/181; 429/121
[58] Field of Search ............... 429/178, 179, 180, 181, 429/121, 161, 158, 160

[56] References Cited

U.S. PATENT DOCUMENTS

| | | | |
|---|---|---|---|
| 2,552,405 | 5/1951 | Chapman | 429/180 X |
| 3,937,634 | 2/1976 | Slautterback | 429/179 X |
| 3,941,615 | 3/1976 | McDowall | 136/38 |
| 4,127,707 | 11/1978 | Ohya et al. | 429/149 |
| 4,331,749 | 5/1982 | Beck, Jr. | 429/179 |
| 4,483,910 | 11/1984 | Julian | 429/179 |
| 4,486,517 | 12/1984 | Bender | 429/149 |
| 4,555,451 | 11/1985 | Harrod et al. | 429/178 X |
| 4,636,447 | 1/1987 | Tate | 429/121 |
| 4,637,965 | 1/1987 | Davis | 429/178 X |

FOREIGN PATENT DOCUMENTS 2305859 3/1976 France ................. 429/180

*Primary Examiner*—Anthony Skapars
*Attorney, Agent, or Firm*—Karla Ojanen

[57] ABSTRACT

An improved electrical connection system for use with corrosive high capacity batteries. Conductor cables are securely cast within the battery into battery terminals to provide a direct and permanent electrical connection between the terminals and the cables. Cable insulation covers the conductor cables at all points above the terminal-cable connection. All connections are secured by using the methods of casting, welding, potting or crimping. Seals made from a nonconducting material extend the exterior of the battery over all electrical connections and further enhance the mechanical integrity of the electrical connections, as well as providing for chemical and electrical isolation of the electrical connections. Thus, the electrical connection system described herein avoids leakage of electrolyte onto the surface of the battery, eliminates frequent repair and maintenance, provides for full voltage delivery, and improves safety.

3 Claims, 2 Drawing Sheets

4,929,522

HIGH CURRENT CAPACITY ELECTRICAL CORROSIVE ELECTROLYTE BATTERY ELECTRICAL INTERCONNECTION SYSTEM

FIELD OF THE INVENTION

This invention relates to an improved electrical interconnection system for high current capacity corrosive electrolyte batteries.

BACKGROUND OF THE INVENTION

In the common configuration of a high current capacity corrosive battery, positive and negative battery plates are submersed in an electrolytic solution. Within the battery, plates of the same polarity are interconnected by a battery strap, and the strap is usually connected to a battery post or terminal. The battery post passes through the battery case to the exterior and is exposed to make an electrical connection to the positive and negative plates of the battery by means of a battery cable clamp mounted on each terminal. The battery cable clamp is tightened around each battery post or terminal by means of a bolt and bolt hole in the clamp. Extending from and connected to the battery post hole of the battery clamp is an insulated battery cable which transports electrical current to a load, e.g., a motor starter. Such connections are now in common use in the automotive industry and elsewhere, and have been presented in U.S. Pat. No. 4,486,517, entitled "WET-CELL STORAGE BATTERY" to Bender; and U.S. Pat. No. 3,941,615, entitled "BATTERY CONSTRUCTION" to McDowall.

Batteries having corrosive electrolytes, such as nickel-, cadmium-, or lead-acid batteries, which employ conventional metal post and metal cable clamp pressure connections develop problems at several sites. First, there is corrosion of the interface surface between the post and the clamp; secondly, the seal between the post and the battery case may break and the electrolyte will migrate freely upon the metal battery posts and between the post and clamp interface surfaces thereby increasing the corrosion. When the electrolyte and the metal react chemically, moreover, a high electrical resistance is created and the electrical connection at the post-clamp interface is destroyed. Thirdly, the connection between the post and the plate strap inside the battery may break, stimulating the likelihood of sparking at the broken connection in the presence of hydrogen and oxygen gases, which results in explosions. Lastly, shorting of the electrically exposed posts and clamps can be quite dangerous.

When the conventional post-clamp interface, now in common use, becomes corroded, it must be cleaned and repaired in order to restore a reasonable electrical connection between the electrolyte and the terminal. In the process of cleaning the poast and the clamp, corroded material is removed until both surfaces are bright and clean, and the metal is uniformly exposed over the entire interface surfaces. After the corroded material has been removed, however, the post diameter is smaller, the inside diameter of the clamp is larger, and the optimum fit between the post and clamp has been destroyed. Repeated cleaning and maintenance of the connections eventually require that the battery cable clamp be replaced to restore a good electrical connection. But if the posts have been markedly reduced, an optimum fit may not be restored even with new cable clamps.

When a battery clamp is being removed for cleaning and reinstalled as described above, there is danger of over-torquing the clamp bolt and nut, especially if the bolt and nut are corroded and resist manipulation. Excessive torque on the battery clamp is transmitted to the battery post and the twisting of the battery post can break the post-to-case seal. When a post-to-case seal has been broken, the electrolyte will seep onto the post, the clamp, and the interfaces; requiring frequent maintenance and repair of the battery connections. As the frequency of cleaning and repairing the connections increases, more damage occurs at the post-case seal which in turn increases electrolyte migration resulting in still more degradation and greater unreliability of the system. Such operations continue until the battery is retired and replaced earlier than otherwise necessary.

Still another disadvantage demonstrated by the electrical connections currently in use is related to the connection between the posts and the battery plates within the battery case. The battery posts are connected internally to plate straps, one post each for the positive plates and for the negative plates. This battery post-plate strap connection can be broken when the battery clamp is over-torqued and those twisting forces are also transmitted to the post-plate strap connection. Once the post-to-case seal is broken as described earlier, the post-plate strap connection can be easily broken as well. At best, a broken internal connection can result in intermittent operation of the battery, but, at worse, an explosion can occur in the battery. If the internal post-plate strap connection is broken, a spark can occur at the broken interface, especially if the battery is being vibrated or mechanically shocked, as is likely to happen when the vehicle is in motion, or when the post is being manipulated manually. In a charged, charging, or especially in an overcharged battery, hydrogen and oxygen gas, produced by electrolysis of water, are present in the battery case. A spark in the presence of this atmosphere will cause an explosion which can break the case. In addition to the destructive explosion itself, the electrolyte, such as sulfuric acid, will splash over the surrounding surfaces and may cause burns or otherwise harm the worker.

The shorting of a preferred electrical path occurs when a less resistive pathway for the current is provided. An alternative electrical current pathway between the battery terminals is established by the migration of the battery electrolyte over the surface of the battery case when the posts are exposed. There are two main causes for electrolyte being on the surface of the battery. First, if the battery cells are overfilled with replenishment water, a dilute solution of the electrolyte spreads over the surface of the battery thereby constituting a current leakage path. Another cause, as previously mentioned, is a broken post-to-case seal. Cleaning the battery removes the current leakage path resulting from the first cause, but, in the second case, there is continuous migration of electrolyte on the battery surface. Such a current leakage path can cause a battery to be discharged, unless it is frequently recharged. Moreover, if a battery is near discharge while in use, and is being vibrated and shocked mechanically, plate material can be shaken off. This material falls to the bottom of the case, and, obviously, the capacity of the battery is reduced. Continuous separation of plate material will, of course, require that the battery be replaced before its expected term of life is reached. The presence of the electrolyte, such as sulfuric acid, on the surface of the battery, moreover, can cause skin and clothing burns. Elimination of surface leakage discharge also reduces or eliminates the nuisances and inconveniences of jump starting and recharging the battery.

Another possibility of shorting a common battery, such as a lead-acid automobile battery, arises because the battery has exposed terminals or posts. A tool, such as a wrench, can simultaneously contact both terminals easily, thereby providing an electrical pathway. Shorting of a high current battery can cause human injury by burns and explosions.

In order to prevent the aforementioned hazards and disadvantages associated with the maintenance and repair of the typical battery, special tools are required. Best practices call for a special clamp puller, a post brush, a clamp brush, and two wrenches used in removing a clamp from the post, cleaning the post, cleaning the clamp, and reinstalling the clamp on the post. If skill has not been developed in the operator and the special tools are not in hand, which is most often true, the possibility of damage to the battery and of an accident is considerably increased.

Attempts to prevent the above-mentioned shortcomings of the existing battery terminal connections have been presented in U.S. Pat. No. 4,331,749, entitled "STORAGE BATTERY STRUCTURE" to Beck; and U.S. Pat. No. 4,127,707, entitled "STORAGE BATTERY" to Ohya et al. Although the patent issued to Ohya teaches a storage battery with an improved seal between the terminal post and the battery cover, the invention, nonetheless, still presents external terminal posts for electrical connection from the battery itself to the battery load.

U.S. Pat. No. 4,331,749, entitled "STORAGE BATTERY STRUCTURE" to Beck presents a battery connection in which the battery conductors are connected directly to the interior plate straps. Note, however, that the electrical conductors are directly exposed to and immersed in the electrolyte. This arrangement presents the conductors as sacrificial elements to the battery electrolyte, thus providing for complete failure of electrical current transport means. The chemical reaction resulting from the exposure of the conductors to the electrolyte, moreover, produces hydrogen, an explosive gas, and copper sulfate, essentially a nonconductor, which will rapidly destroy the electrical conductor and contaminate the electrolyte and the battery plate materials.

The Beck invention presents other shortcomings overcome by the invention disclosed herein. The battery electrolyte and plate materials are easily contaminated. The plastic covering of the conductor provides a means of escape of the electrolyte from the battery and exposes the conductor to the electrolyte, resulting in complete destruction of the conductor within the plastic covering. Additionally, the terminal connections can be easily corroded because they are exposed to the transported electrolyte. Shorting is actually promoted and enhanced at the junction box presented in the Beck invention because the conducting surfaces are brought into closer proximity at the junction box than the posts of a standard battery. Lastly, there is a possibility of electrolyte leakage at the "grommet" interfaces with the conductor plastic covering and the battery case.

SUMMARY OF THE INVENTION

An improved electrical interconnection system for use with high current capacity electrical corrosive electrolyte batteries has been invented. An insulated wire cable is directly attached to the battery terminal within the battery. This electrical connection, in conjunction with the improved battery terminal-case seal, provides for electrical and chemical isolation of all electrical connections. Insulated cables extending from the battery are arranged to prevent shorting.

It is thus an object of the present invention to promote safety, improve reliability, reduce costs, and advance convenience by eliminating the present need for hazardous maintenance and repair of battery terminal connections, eliminating or greatly reducing battery down time and the need for jump starting an automobile, for instance.

It is an object of the present invention to eliminate damage to the battery and battery loads.

It is still another object of the present invention to provide an improved battery post-case seal which contributes to cleanliness in the use of high current corrosive electrolyte batteries by eliminating the presence of electrolyte on the battery surface, reducing corrosion of the battery hold down clamps and bolts; and reducing the incidence of electrolyte burns to skin and clothing.

It is another object of the present invention to provide an improved sealing means both for the conductors and the battery case.

BRIEF DESCRIPTION OF THE DRAWINGS

Other objects and advantages of the invention will become apparent upon reading the following detailed description and upon reference to the drawings in which.

Figure 1:
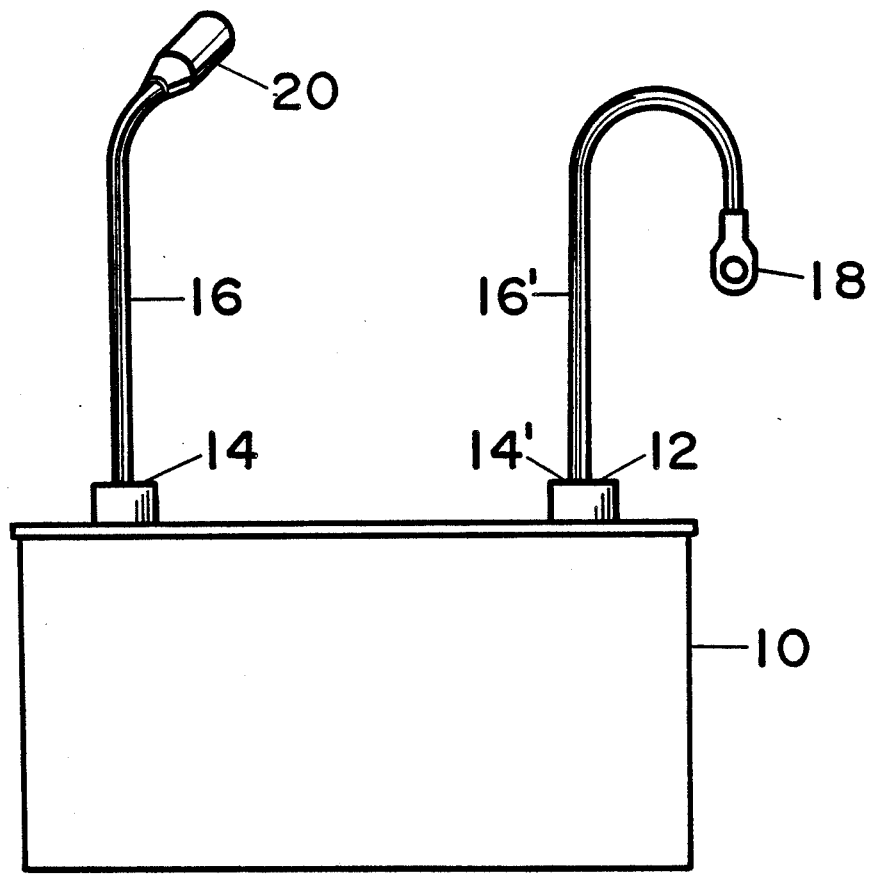
FIG. 1 is a drawing of the invention embodied in a high current corrosive electrolyte battery showing the improved method of connection.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

DESCRIPTION OF THE PREFERRED EMBODIMENT

Referring to FIG. 1, a battery case 10 with the improved sealed battery connection 12 of the invention is shown. Extending from the sealed battery connection 12 at both the negative and the positive terminals 14, 14' are flexible battery conductor cables 16, 16'. At the end of one of the flexible battery cables 16' is a grounding terminal lug connector 18, while extending from the other battery cable 16 is an insulated ungrounded connector 20 for connection to the battery load.

Figure 2:
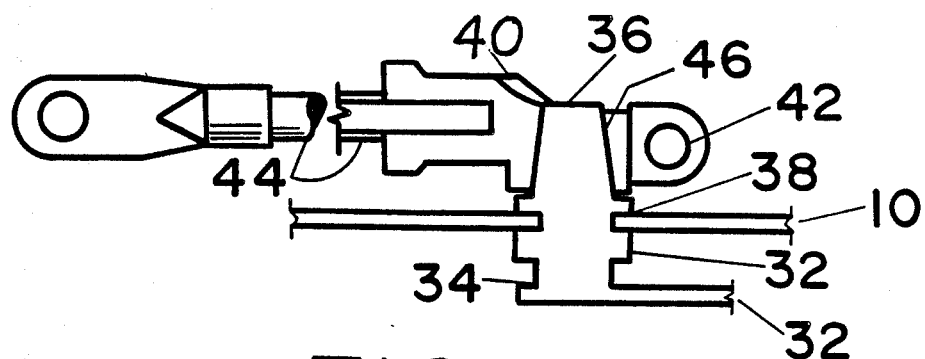
FIG. 2 is a drawing of the common configuration of a lead-acid battery using the typical electrical connections.

A conventional lead-acid battery electrical combination is shown in FIG. 2. Within the battery case 10, a battery plate strap 30 interconnects all the battery plates (not shown) of the same polarity. The battery plate strap 30 is in turn connected to a battery terminal 32 at a plate-terminal connection 34. The battery terminal 32 is connected to a battery post 36 which extends upward through a battery case seal 38 to the exterior of the battery. Typically, a cable clamp 40, which can be tightened around the outer circumference of the battery post 36 by means of a nut and bolt (not shown) through the cable clamp bolt hole 42, is connected to an insulated battery cable 44. One terminal 32 is connected to a battery cable 44 which leads to ground, whereas a terminal 32 of opposite polarity is connected to another cable 44 leading to the battery load.

The conventional lead-acid battery as shown in FIG. 2 has the potential for a number of failures resulting in impaired electrical connections. For example, the post-clamp interface 46 requires regular maintenance because of corrosion of the materials resulting from the leakage or spillage of electrolyte onto the battery surface. Cleaning these surfaces requires removal of the battery cable clamp 40 which may require excessive torque. This excessive torque can break the battery post-case seal 38 causing increased leakage of the electrolyte onto the battery surface and the post-clamp interface 46. Alternatively, or in addition, the plate-terminal connection 34 can also be twisted and broken, either causing intermittent electrical contact which may trigger a spark as discussed in the Background, or cause a permanent break in the electrical path requiring replacement of the battery.

Figure 3:
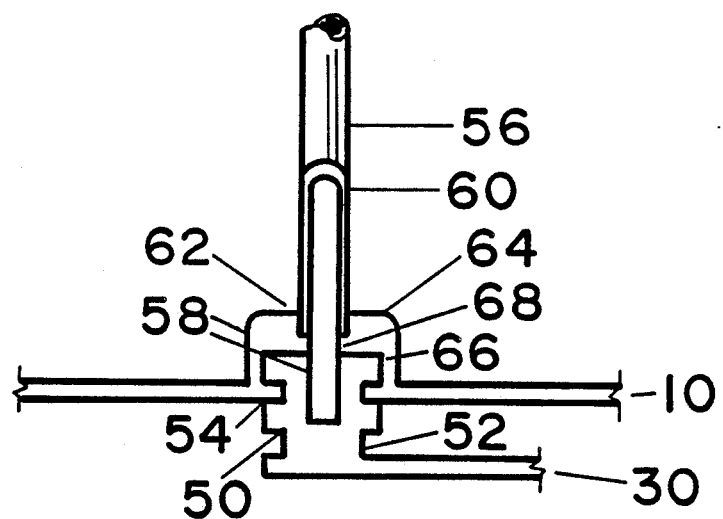
FIG. 3 is a view of the invention showing in detail the battery terminal connection and the battery case seal embodied in the invention for corrosive electrolyte batteries.

Reference is now made to FIG. 3, which shows in greater detail the improved battery connection 12 of FIG. 1. Although FIG. 1 illustrates only one battery connection 12 embodied by the invention, there will be two such connections 12 in the battery because one connection 12 will be required for the electrical connection of positive polarity and one connection 12 will be required for the electrical connection of negative polarity. These electrical connections 12 may be conventionally located at opposite ends of the battery, and may extend from either the top or the sides of a battery.

An internal battery plate strap 30 interconnecting all the plates of one polarity is integrally connected to a battery terminal 50 at a strap-terminal connection 52 that may be cast or welded. The battery electrical terminal 50 is potted or cast into the battery case 10 material forming an electrolyte battery terminal seal 66 having a strong mechanical bond between the battery case 10 and the battery electrical terminal 50. A conductor cable 56 extends concentrically into the battery terminal 50 to which the cable 56 is integrally cast or pressure-connected (crimped) to form a permanent cable-terminal electrical connection 58. The battery case 10 material is potted to the conductor cable 56 forming still another mechanically strong case-conductor seal 68. This arrangement not only eliminates the need for the extraneous battery post 36 (see FIG. 2), but also the battery cable clamp 40 (see FIG. 2) and the conventional battery cables 44 (see FIG. 2), all of which have to be replaced frequently. In part, the improved battery connection 12 is the result of this direct, secure, and permanent cable-terminal connection 58 between the conductor cable 56 and the battery terminal 50.

Cable insulation 60 surrounds the conductor cable 56 just above the cable's 56 electrical contact with the battery terminal 50. The cable insulation 60 is also directly potted into the battery case 10 forming a battery case-cable insulation seal 62 with a strong mechanical bond. Those skilled in the art will appreciate the safety feature provided by this arrangement. Because the conductor cable 56 is covered by the cable insulation 60 and the insulated ungrounded connector 20 (see FIG. 1) at all points above the case-conductor seal 68, there is no possibility of accidental shorting between the terminals of the battery, thereby enhancing safety and preventing possible damage to the battery and surroundings.

It is thus a preferred embodiment of the invention, and as shown in FIG. 3, that the battery case 10 material not only seals the battery terminal 50, but also the conductor cable 56 and conductor cable insulation 60 at the battery terminal-case seal 66, the battery case-conductor seal 68, and the battery case-cable insulation seal 62, respectively. The invention thus improves upon the art of providing a primary, rather than auxiliary, sealing arrangement with increased mechanical integrity achieved by increasing the interface surface area between the battery case 10 and these components at these seals. This arrangement not only eliminates leakage of electrolyte from the inside of the battery to the electrical connections, but also prevents contamination of the electrolyte within the battery resulting from a chemical reaction between the electrolyte and the conductor cable material. In the arrangement the positive and negative polarities of the battery are chemically and electrically isolated from each other. The improved sealed battery connection 12 embodied in the invention also prevents the plate strap-terminal connection 52, the cable-terminal connection 58, and the battery terminal-case seal 66 from being subject to the torque or other forces intentionally or inadvertently applied in the cleaning operations common with conventional battery connections. Because the aforementioned connections are not subject to the above-mentioned torque stresses, their integrity is maintained. For instance, enhanced integrity of the strap-terminal connection 52 reduces or eliminates the chance of an internal spark occurring in the presence of explosive gases, hydrogen and oxygen. The enhanced structural integrity of the battery terminal case seal 66, the case-cable insulation seal 62, and the battery case-conductor seal 68 prevent surface contamination by leakage and migration of the electrolyte and the surface of the battery will be clean and free of electrolyte, except for careless overfilling of replenishment water. The enhanced integrity of the battery terminal-case seal 66, the battery case-conductor seal 68, and the battery case-cable insulation seal 62 also eliminate the possibility of an electrical leakage discharge current path which causes a conventional battery to be in some degree of discharge at all times. Thus, the invention provides for prolonged life of the battery.

The improved battery connection 12 takes advantage of not only the direct connection of the conductor cable 56 into the battery terminal 50 at the cable-terminal connection 58, but also the battery terminal-case seal 66 to reduce damage to battery loads such as engine starting motors by maintaining a positive connection and eliminating a voltage drop at the electrical connections. Full voltage is delivered to the load and higher voltage can be delivered as a result of less resistance of the electrical connection 12. Thus, batteries which incorporate the electrical connection 12 as embodied herein will have a high duty cycle, a longer life; and load components, e.g., the starter solenoid and motor, will operate at maximum efficiency for a longer life.

Thus, a new interconnection system for high current capacity electrical batteries has been invented which provides improved reliability by replacing the conventional battery terminal connection system with a permanent non-corroding electrically and chemically isolated connection. Battery capacity and service life is increased, and damage to battery loads, e.g., the starter motor, is decreased. Safety is enhanced in a number of ways: first, the likelihood of electrolyte skin and clothing burns is reduced because the improved sealing arrangement of the battery terminal, the conductor, and the conductor insulation reduces the likelihood of the presence of electrolyte on the surface of the battery; second, the likelihood of an explosion within the battery resulting from an intermittent electrical spark between a broken battery strap-terminal connection is eliminated; and, finally, the hazards associated with frequent battery maintenance and repair, especially if inexpertly accomplished, is eliminated. Reliability of battery performance is greatly enhanced, thereby decreasing or eliminating battery down-time. Overall savings are realized because battery and motor starter life are extended, and because conventional battery cables and clamp connectors are no longer required, thereby eliminating connector repair and maintenance.

We claim:

1. A battery electrical connection system for use with corrosive electrolyte batteries comprising;
   a. a plurality of battery terminals, each being integrally attached to a plate strap within a battery;
   b. a plurality of conductor cables, each securely cast and engaged into one of said battery terminals to form an electrical connection;
   c. conductor cable insulation;
   d. a plurality of battery seals integral with and extending the exterior of said battery over said electrical connections, wherein said seals electrically and chemically isolate each of said electrical connections;
   e. a conductor cable terminal lug connector; and
   f. an insulated ungrounded connector;
   wherein one of said conductor cables is securely engaged into one of said battery terminals to provide an electrical connection within a battery; and wherein said cable insulation covers each of said conductor cables above said electrical connection between said conductor cables and said battery terminals; and wherein said battery case seals are integral with and extend the exterior of said battery over said battery terminals, said conductor cables, and said cable insulation; and wherein said conductor cable terminal lug connector extends from one of said conductor cables and connects to a common ground for a battery load; and wherein said insulated ungrounded connector extends from the other of said conductor cables and connects to an ungrounded battery load terminal for completion of an electrical circuit.

2. A battery electrical connection system in accordance with claim 1 wherein said seals are composed of an electrically nonconductive material, and wherein said seals integrally extend the exterior of said battery over each of said terminals, said conductor cables and said cable insulation to securely enclose said terminals, said electrical connection between said terminal and said conductor cable, said conductor cable, and said cable insulation to form an integral electrolyte seal.

3. A battery electrical connection system in accordance with claim 1 wherein said electrical connection further comprises said conductor cable securely cast into one of said battery terminals to provide a direct and permanent electrical connection.

* * * * *